United States Patent [19]

Simpson et al.

[11] Patent Number: 5,154,822
[45] Date of Patent: Oct. 13, 1992

[54] BONDED CHROMATOGRAPHIC STATIONARY PHASE

[75] Inventors: Colin F. Simpson, Brighton; Teck M. Khong, London, both of England

[73] Assignee: 3i Research Exploitation Limited, London, England

[21] Appl. No.: 839,291

[22] Filed: Feb. 26, 1992

Related U.S. Application Data

[63] Continuation of Ser. No. 554,170, Jul. 20, 1990, abandoned, which is a continuation of Ser. No. 303,725, Jan. 23, 1989, abandoned.

[30] Foreign Application Priority Data

Jul. 28, 1986 [GB] United Kingdom ................ 8618322

[51] Int. Cl.$^5$ .............................................. B01D 15/08
[52] U.S. Cl. .............................. 210/198.2; 210/502.1; 210/635; 210/656; 502/401; 502/402; 502/439
[58] Field of Search ...................... 210/635, 656, 198.2, 210/502.1; 502/401, 402, 439; 55/67, 386

[56] References Cited

U.S. PATENT DOCUMENTS

| | | | |
|---|---|---|---|
| 3,716,502 | 2/1973 | Loew | 264/49 |
| 3,722,181 | 3/1973 | Kirkland | 55/386 |
| 3,983,299 | 9/1976 | Regnier | 210/656 |
| 4,029,583 | 6/1977 | Ho Chang | 55/386 |
| 4,108,218 | 8/1978 | Estes | 502/437 |
| 4,324,689 | 4/1982 | Shah | 210/198.2 |
| 4,608,449 | 8/1986 | Baerns | 585/415 |

FOREIGN PATENT DOCUMENTS

| | | | |
|---|---|---|---|
| 50167 | 4/1982 | European Pat. Off. | 210/198.2 |
| 1163784 | 2/1964 | Fed. Rep. of Germany | 210/198.2 |
| 612170 | 6/1978 | U.S.S.R. | 210/198.2 |
| 1033180 | 8/1983 | U.S.S.R. | 210/198.2 |
| 1310872 | 3/1973 | United Kingdom | 210/198.2 |
| 2103196 | 2/1983 | United Kingdom | 210/198.2 |

OTHER PUBLICATIONS

Chemical Abstracts, vol. 99, No. 20, Abstract No. 160708j, Nov. 1983, p. 123.
Chemical Abstracts, vol. 90, No. 6, Abstract No. 612170, Feb. 1979, p. 100.
Snyder, Introduction to Modern Liquid Chromatography, Second Edition, John Wiley, 1979, pp. 177-183 and 272-279.
Mikes Laboratory Handbook of Chromatographic and Allied Methods, John Wiley, 1979, pp. 176-177.
Brunner and Schutte, "Chem-iker-Zeitung/Chemische", Apparatur 89, (Jul. 1965), pp. 437-440.

Primary Examiner—Ernest G. Therkorn
Attorney, Agent, or Firm—Nixon & Vanderhye

[57] ABSTRACT

An organic compound is bonded to a powdered solid support to produce, for example, a chromatographic stationary phase, by introducing to a bed of powdered material the vapor of a precursor of the compound to be bonded which precursor is selected from those which produce a gas phase by-product of the bonding reaction. The gas generated by the reaction is utilized as the fluidizing gas. This permits the use of fluidized bed techniques on extremely low particle size powders. One example is the reaction of alkylchlorosilanes with silica gel to produce stationary phases with bonded carbon chains, derived from the alkyl groups, of up to 24 carbon atoms. A second feature of the method is the hydrothermal pretreatment of the bed of powder with steam to precondition the support.

18 Claims, 5 Drawing Sheets y = 15.855 − 0.0139x  R = 1.00

BONDED CHROMATOGRAPHIC STATIONARY PHASE

This is a continuation of application Ser. No. 07/554,170, filed Jul. 20, 1990, now abandoned, which is a continuation of U.S. Pat. No. 07/303,725 filed Jan. 23, 1989, now abandoned.

This invention relates to an improved chromatographic stationary phase for use in liquid chromatography and, in particular, reversed phase chromatography, its manufacture and its use in analytical and preparative chromatographic separations. Particularly, but not exclusively, the invention relates to silica-bonded stationary phases.

Silica-bonded stationary phases for use in normal or reversed phase chromatography are known. Such materials are prepared by chemical reaction between active groups on an organic stationary phase precursor and surface-residing hydroxyl groups on pulverulent or granular silica gel support material. Most commonly the stationary phase precursor is an organically substituted chlorosilane which reacts with the surface silanols on the silica gel, with elimination of hydrogen chloride, to form a siloxane link between the stationary phase and the support. The reaction is carried out by suspension of the finely divided silica gel in an anhydrous solvent solution of the chlorosilane. Following reaction the silica-bonded stationary phase has to be freed of solvent traces. A disadvantage of the solvent reaction is that reaction sites may be shielded by the solvent molecules thus preventing the reactant from reacting with the surface hydroxyl groups and thus inhibiting the maximisation of the number of reactant molecules which can be linked to the support. Also agglomeration and other forms of uneven distribution of the particules of powdered substrate within the solvent phase leads to non-reproducibility and non-repeatability of the bonded phase product. The separative ability of the stationary phase in use is adversely affected by this non-uniformity in preparation. Additional disadvantages of the solvent phase reaction are that there is waste of the expensive chlorosilane precursor and a waste of time and energy in removing and, isolating the pure product from the reaction mixture. Also, the chlorosilane precursor has, of necessity, to be relatively pure to minimise undesirable side-reactions between impurities in the chlorosilane and the support.

For efficient chromatographic separation of mixtures it is desirable that the surface area of the stationary phase presented to the mixture be as large as is practically possible and this is achieved using small particles of narrow size distrbution of a highly porous nature. Commercially available bonded stationary phases of this type may have particle sizes in the range of from 3 to 50 micrometers and pore sizes in the range of from 50 to 350 Angstrom units.

An object of the present invention is to provide a method for bonding suitable organic compounds to solid pulverulent or granular supports.

A further object of the present invention is to provide an improved bonded stationary phase for use in reversed phase chromatography.

According to the present invention there is provided a method of bonding an organic compound to a pulverulent solid support comprising selecting a precursor of the organic compound which includes an active group capable of reacting under anhydrous conditions with a surface group on the support with concomitant gas or vapor evolution, introducing said precursor in the gaseous state to a bed of pulverulent solid support of a material having accessible surface groups for reaction and permitting the gas or vapour evolved by the reaction between the precursor and the support to fluidise the bed.

Most preferably the support is silica gel. However, for particular applications it may be necessary or desirable to use other materials such as metal oxides, for example alumina, titania, zirconia and ceria. In theory at least, any solid material which possesses the surface groups necessary for reaction with the active group on the precursor may be bonded to an organic compound by the method of this invention, provided, of course, that it is not otherwise degraded by the reaction conditions.

Silica gel is the most preferred support material for use in this invention and the organic compound is desirably an organically substituted chlorosilane which on reaction by the method of the invention produces a silica-bonded stationary phase for use in analytical or preparative bonded phase chromatographic separations.

The present invention is not principally concerned with the chemistry involved in the bonding reaction or the selection of the two materials concerned but rather with the technique for handling the reactants.

The invention may utilise as stationary phase precursor an organically substituted silane which may be represented by the general formula $(R)_n SiX_{4-n}$ or, more preferably, $R(CH_3)_2 SiX$, where R is hydrogen, an alkyl group or a substituted alkyl group examples of which are aminoalkyl, alkylaminoalkyl and cyanoalkyl, an aryl group or a substituted aryl group, or the group RO; and X is an hydroxyl-reactive substituent such as a halogen atom or an alkoxy group which, on reaction with hydroxyl produces, under reaction conditions, as gaseous by-product hydrogen halide or alcohol at the temperature of the reaction. The alkyl group may have up to 24 or more carbon atoms although, from the point of view of the chromatographic separative property of the final product, there appears to be no great advantage in chain lengths exceeding about 18 carbons. The preferred alkyl range is from one to 18 carbon atoms in straight or branched chain configuration and the groups most preferred by users are octyl and octadecyl groups. However, the chain length is, of course, chosen having regard to the end use: for example, for the separation of delicate biomolecules, such as proteins, which may be denatured by long chain bonded phases, alkyl groups of from 3 to 5 carbon atoms are indicated.

Examples of preferred precursors are: alkylchlorosilanes such as octyldimethylchlorosilane, alkyltrichlorosilanes such as octadecyltrichlorosilane, trialkoxyalkylsilanes such as octyltrimethoxysilane and octyltriethoxysilane, and, trialkoxysilylalkylamines such as 3-aminopropyltrimethoxysilane.

For the production of long bonded chains or those of complex structure it is preferable to bond initially a molecule of simple structure such as chlorodimethylsilane, $Cl(CH_3)_2 SiH$, to the silica surface and then to introduce in the fluidised bed one or more sequential chemical reactants to build up the desired structure. However, since the initial reaction in the fluidised bed establishes the uniformity of distribution of the stationary phase, subsequent modification may be carried out by the traditional solvent reaction method should there be advantage in doing so.

The present invention is intended primarily for the production of the so-called "brush-type" bonded phases. British Patent Number 1,310,872 relates to such materials and also exemplifies many stationary phases of advantage in chromatography and which may be applied equally in the context of the present invention. The present invention may also be used with advantage for the production of polymeric bonded phases.

The stationary phase component may comprise from 1.5% to 20%, preferably from 3 to 20% by weight of the bonded product.

The silica gel preferably has as small a particle size distribution of a size appropriate to the intended application. In practical terms this would mean a particle size in the region of from 1 to 50 micrometers and more preferably from 3 to 35 micrometers. The pore size is preferably large to permit free flow of large molecular species and thus maximise contact with the stationary phase and distribution between the stationary phase and the mobile phase when used for chromatographic separation. Preferred pore sizes are from 50 to 500 Angstrom units.

It is also desirable that, to obtain a repeatable and reproducible product, the silica gel starting material be preconditioned to a desired standard condition. For example, prior to reaction with the precursor, the silica gel may be preconditioned in the fluidisation tower by steam treatment in the fluidised state at a suitable elevated temperature in order to produce a consistent level of surface silanol groups for reaction with the precursor. The preferred hydrothermal treatment parameters are a temperature of from 100° to 400° C. for a period of from 3 to 24 hours but both the temperature and time may be increased or reduced according to the intended application. Alternatively, the silica gel may be preconditioned by heat treatment in a stream of pure, dry inert gas but, however, under this condition the bed is not truely fluidised.

Fluidised bed techniques and the physical properties of fluidised beds are, of course, well known. Such procedures are known to give uniform enveloping of the fluidised material by the fluidising gas flow. However, it is well accepted in the art that the use of gas-phase fluidised beds is restricted to materials of particle sizes no smaller than about 50 micrometers below which fluidisation cannot be maintained. Attempts to fluidise beds of materials of less than about 50 micrometers results in channelling of the fluidising gas through the bed or expulsion of the particles from the bed in the gas flow and thus the uniformity of exposure of the particles to the gas phase which is the main object of the process is not achieved.

In a method of this invention the fluidisation is achieved and maintained during the bonding reaction by the entrainment gas or vapour generated in situ by the reaction itself. This is an entirely novel procedure not previously reported in the literature.

It may be advantageous to moderate the rate of reaction by diluting the vapour of the stationary phase precursor, for example an alkyldimethylchlorosilane, with an inert gas such as nitrogen or argon.

BRIEF DESCRIPTION OF THE DRAWINGS

FIGS. 6A, 6B, 6C, 7A, 7B, and 7C are chromatograms of a test mixture.

DESCRIPTION OF THE PREFERRED EMBODIMENTS

Figure 1:
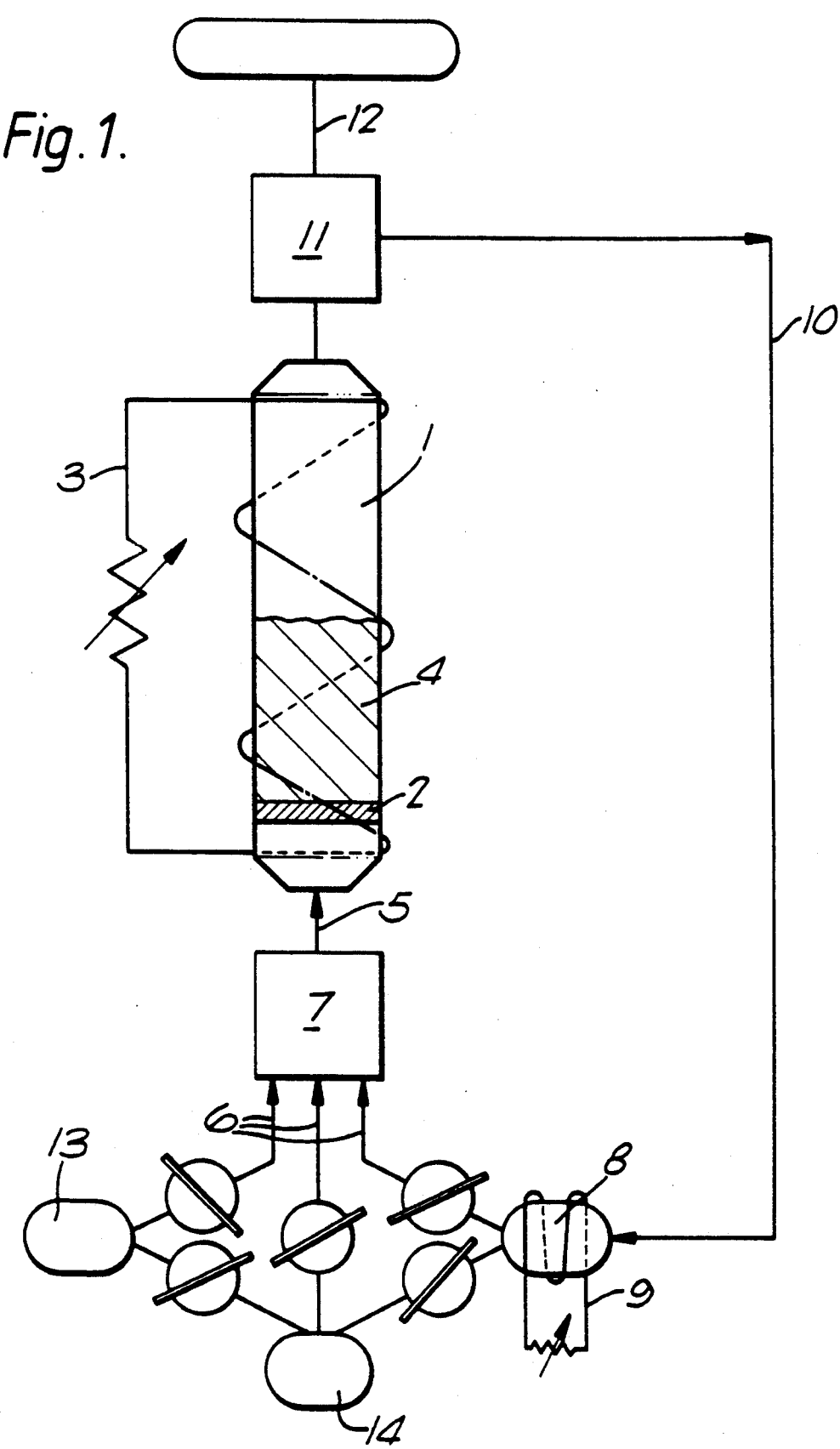
FIG. 1 of the accompanying drawing illustrates schematically apparatus suitable for the performance of this invention.

Referring to the FIG. 1, an upright elongate fluidising tower 1 is fitted with integral fritted glass gas distributor plate 2 of Grade 2 porosity and an externally wound electric resistance heater 3. A bed 4 of pulverulent silica gel is located in the fluidising tower and is supported by the gas distributor plate 2. It may be necessary or desirable to choose the porosity of the distributor plate 2 with regard to the particle size and density of the solid support. The porosity may be altered by changing the plate or by interposing a layer of glass beads between two plates. The aim is, of course, to establish a uniform pressure drop across the entire surface of the plate and hence a uniform gas-flow pattern.

Inlet pipe 5 leading into the base of the fluidising tower 1 communicates with a gas inlet manifold 6 which has an externally wound electric resistance heater 7. A vaporiser vessel 8 is heated by an electrical heating mantle 9 and communicates by pipework with the gas inlet manifold 6 and thence to the base of the fluidising tower 1. Recycle pipeline 10 leads from the top of the fluidising tower 1 via a water condenser 11 back to the vaporiser 8. The fluidising tower 1 is provided, via condenser 11, with an atmospheric vent line 12.

Reference numerals 13 and 14 represent reservoirs of materials such as inert gas, steam and other reactants and are connected via the manifold 6 by valving arrangements.

In use, the bed of pulverulent silica gel 4 is purged with a flow of dry inert gas passed into the fluidising tower 1 via one of the manifold inlets 6. This initial purging with inert gas sweeps unwanted fines from the bed 4, the flow of gas bearing the fines being diverted to atmosphere by vent 12 as it leaves the top of the fluidising tower 1.

At this stage hydrothermal treatment of the silica gel may be accomplished by introducing steam through the distributor plate 2 and venting to atmosphere. After treatment it is usual to allow the bed to rest for a short period to stabilise and to remove the steam.

Liquid chlorosilane stationary phase precursor is vaporised in the vaporiser 8 and the vapour flows to the inlet manifold 6, which is heated by heater 7 to a temperature sufficient to maintain the chlorosilane in the vapour phase, and thence to the fluidising tower 1, which is also heated to the required reaction temperature, entering beneath the distributor plate 2. As the vaporous chlorosilane contacts the silica gel within the fluidising tower 1 reaction with hydroxyl groups on the silica gel occurs with evolution of hydrogen chloride gas. The evolved gas fluidises the bed of pulverulent silica gel promoting even distribution of the reaction around the silica gel particles and uniform heat distribution.

To moderate the reaction, which evolves a great deal of heat of reaction, it may be desirable to provide a gaseous inert gas diluent. This may be pass from the reservoir 14 via 8, and entrains and dilutes the reactant precursor through to the manifold 6 and thence to the bed 4 in the tower 1.

After passage up the tower 1, excess chlorosilane vapour is condensed in condenser 11 and returned to the vaporiser 8 via line 10 for recycling. The system may remain on recycle until the reaction is completed.

Subsequently the silica-bonded stationary phase may be removed from the fluidising tower 1, or, should second or subsequent reactions be necessary or desirable, these may be carried out in a similar fashion as the main bonding process by delivering successive reactants to the bed 4 of prepared stationary phase in the fluidising tower 1 via the manifold 6.

The method of the invention will now be described, by way of illustration, in the following Examples.

EXAMPLE 1

Preparation of C8-220

About 25 grams of silica gel, of particle size 25 micrometers and nominal pore size of 300 Angstroms, was placed in a fluidising tower (about 45 mm i.d.) to give a bed depth of about 50 mm.

Dry nitrogen was passed through the bed at 100 ml/min for about 3 hours at a bed temperature of 200° C., when there was no longer any water vapour being evolved.

A water condenser was then attached to the top of the fluidising tower. About 35-50 ml of octyldimethylchlorosilane was placed in the vaporiser and heated to near its boiling point of about 200° C. A valve connecting the reservoir in the fluidising tower was then opened, allowing the vapour of precursor to flow to the bed (which was maintained at about 200° C. after the initial heat pre-treatment). Reaction temperature was maintained in the region of 200° C. Excess octyldimethylchlorosilane was condensed on leaving the top of the fluidising tower and recycled to the reservoir.

The reaction was stopped after 4 hours and the valve connecting the reservoir to the fluidising tower was closed. Simultaneously, dry nitrogen was allowed to flow to the bed with a flow rate of about 150-200 ml/min, thereby maintaining fluidisation. When no excess reagent was observed to condense from the effluent nitrogen flow, the bed was reduced to room temperature whilst maintaining the nitrogen flow. When room temperature was reached the nitrogen flow was discontinued.

The bonded phase was then removed and stored in a dry bottle, in a state ready for column packing. Performance and analytical data are given in Tables 1 and 2 respectively.

EXAMPLE 2

Preparation of C8-360

As described in Example 1 but, after the initial heat pre-treatment, bed temperature was increased to about 360° C. before reaction was allowed to commence. Reaction temperature was maintained at about 350°-360° C. throughout. Performance and analytical data are given in Tables 1 and 2 respectively.

EXAMPLE 3

Preparation of C8-liq (for comparison)

About 60 grams of silica gel, of particle size 25 micrometers and nominal pore size of 300 Angstroms, was placed in an oven for 24 hours, at a temperature of about 200° C.

About 50 grams of the pre-treated silica gel was placed in a 1-litre Quickfit (Trade Mark) 3-necked round bottom flask with three pieces of porous pot. To this was added about 500 ml of sodium-dried n-heptane. A reflux condenser with a drying tube and a dropping funnel were fitted. The apparatus was purged with dry nitrogen before reaction. The reaction mixture was heated to reflux when 10 ml of octyldimethylchlorosilane was added dropwise via the dropping funnel. The reaction mixture was heated under reflux for about 6 hours.

The bonded phase was then filtered through a no. 3 porosity sinter and washed successively in 25 ml each of tetrahydrofuran (THF), n-heptane, THF, methanol and finally THF. It was then vacuum dried in a desiccator overnight before being stored in a dry bottle, in a state ready for column packing. Performance and analytical data are given in Tables 1 and 2 respectively.

EXAMPLE 4

Preparation of C8-L/F

As described in Example 1 but, about 25 grams of the bonded phase prepared in Example 3 (C8-liq) was placed in a fluidising tower (about 45 mm i.d.) to give a bed depth of about 50 mm. A water condenser was then attached to the top of the fluidising tower. About 35-50 ml of octyldimethylchlorosilane was placed in the vaporiser and heated to near its boiling point of about 200° C. The bed was heated up to about 200° C. before a valve connecting the reservoir to the fluidising tower was opened, allowing the vapour of the precursor to flow to the bed. Reaction temperature was maintained in the region of 200° C. Excess octyldimethylchlorosilane was condensed on leaving the top of the fluidising tower and recycled to the reservoir. The reaction was carried out for 4 hours.

Performance and analytical data are given in Tables 1 and 2 respectively.

EXAMPLE 5

Preparation of 'SQUAL'

About 25 grams of silica gel, of particles size 25 micrometers and nominal pore size of 300 Angstroms, was placed in a fluidising tower (about 45 mm i.d.) to give a bed depth of about 50 mm.

Dry nitrogen was passed through the bed at 100 ml/min. for about 3 hours at a bed temperature of 200° C., when there was no longer any water vapour being evolved. The temperature was then reduced to about 60° C.

A water condenser was attached to the top of the fluidising tower. About 35-50 ml of dimethylchlorosilane was placed in the vaporiser and heated to near its boiling point of about 47°-50° C. A valve connecting the reservoir to the fluidising tower was then opened, allowing the vapour of the precursor to flow to the bed. The reaction temperature was maintained in the region of 60°-70° C. Excess dimethylchlorosilane was condensed on leaving the top of the fluidising tower and recycled to the reservoir.

After 4 hours, the reaction was stopped; the valve connecting the reservoir to the fluidising tower was closed. Simultaneously dry nitrogen was allowed to flow to the bed with a flow rate of about 150-200 ml/min, thereby maintaining fluidisation. When no excess reagent was observed to condense from the effluent nitrogen flow, the bed was reduced to room temperature while maintaining the nitrogen flow. When room temperature was reached the nitrogen flow was discontinued.

The bonded phase was then removed and placed in a 1-litre Quickfit (Trade Mark) 3-necked round bottomed flask with three pieces of porous pot. About 500 ml of sodium-dried n-heptane and 25 ml of squalene were added. A crystal of chloroplatinic acid, about 10 mg, was dissolved in minimum of n-propanol, about 3 ml. The chloroplatinic acid solution was added to the reaction mixture. A reflux condenser with a drying tube was fitted. The apparatus was purged with dry nitrogen before reaction. The reaction was continued under reflux for about 6 hours.

The bonded phase was then filtered through a No. 3 porosity sinter and washed in 25 ml each of THF, n-heptane, THF, methanol and finally THF. It was then vacuum dried in a dessicator overnight. The bonded phase was then removed and stored in a dry bottle, in state ready for column packing. Performance and analytical data are given in Tables 1 and 2 respectively.

Results and Comparisons

Prepared bonded phases were packed into liquid chromatography stainless steel columns of 4.6 mm inside diameter and 25 cm length and tested on the separation of a mixture containing acetone, phenol, para-cresol, 2,5-xylenol, anisole and phenetole. For the purpose of comparison a similar test was run using (a) "C8-LIQ" which was prepared as described in Example 3 using the same starting materials and (b) "Spherisorb S10W-ODS" (SPHER) which is a commercially available C-18 stationary phase column. Table I below gives the comparative retention volumes for the components of the mixture and Table II gives the carbon and hydrogen contents of the bonded phases.

EXAMPLE 6

Preparation of $C_{18}$ Bonded Phase

About 25 grams of silica gel of particle size 7 micrometers and nominal pore size of 100 Angstrom units, was placed in the fluidising tower (about 45 mm internal diameter) to give a bed depth of about 50 mm. The fluidising tower employed was fitted with a "packed sandwich" distributor consisting of two sintered glass frits and glass Pyrex (Trade Mark) beads.

The silica gel was activated, by hydrothermal treatment, i.e. by passage of steam through the bed at 200° C. The steam was carried up the bed by a flow of dried argon at about 100 ml/min. This treatment was continued for 8 hours.

A water condenser, with both cooling and heating facilities, was then attached to the top of the fluidising tower. About 35 to 50 ml of octadecyldimethylchlorosilane was placed in the vaporiser and heated to near its boiling point of about 340° C. A valve connecting the reservoir to the tower was then opened, allowing the vapour of the precursor to flow to the bed which was maintained at about 340° C. after the initial hydrothermal pre-treatment. Reaction temperature was maintained in the region of 340° C. Excess octadecyldimethylchlorosilane was condensed and solidified on leaving the top of the tower. The water condenser was cyclically heated allowing the octadecyldimethylchlorosilane to liquefy for recycle to the reservoir.

The reaction was stopped after about 8 hours and the valve connecting the reservoir to the tower was closed. Simultaneously dry argon was allowed to flow to the bed with a flow rate of about 150-200 ml/min, thereby maintaining fluidisation. When no excess reagent was observed to condense from the effluent argon flow, the bed was reduced to room temperature whilst maintaining the argon flow. At room temperature the argon flow was discontinued.

The bonded phase was removed from the tower and stored in a dry bottle in a state ready for column packing. Chromatograms of this packing material were compared with commercially available column packings derived from the same base silica gel (as will be described later).

Figure 3:
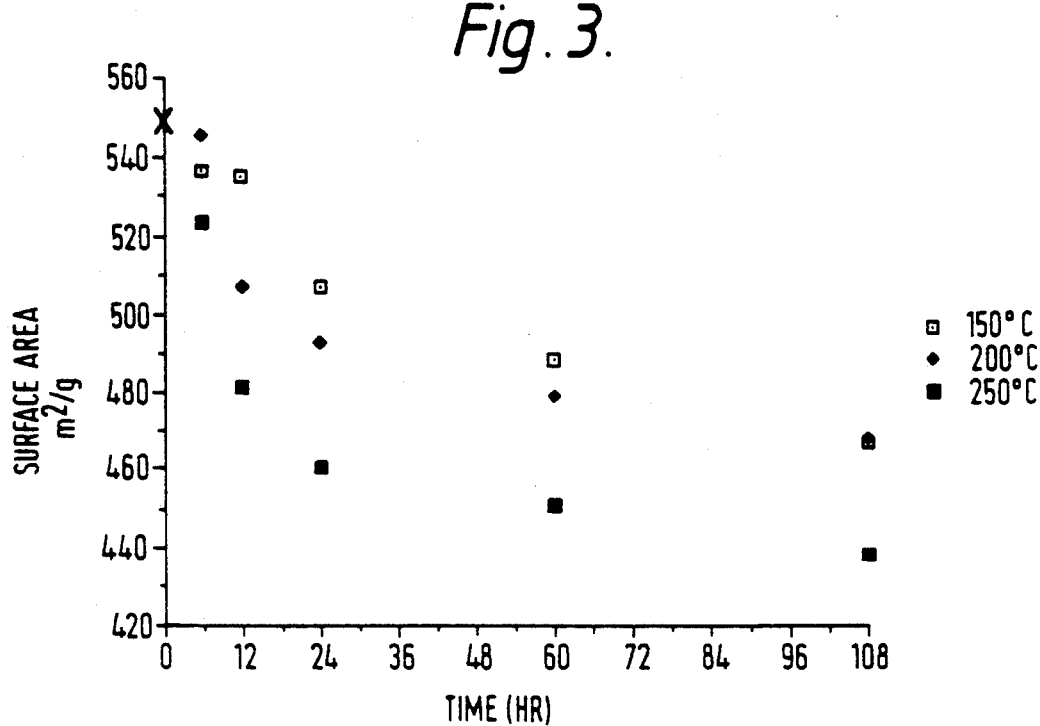
FIG. 3 shows a graphical representation of the effect of the duration of the hydrothermal treatment on the surface area of identical samples of silica gel at three hydrothermal treatment temperatures.

FIG. 3 shows a graphical representation of the effect

TABLE I

| Phase | Dead Vol. (ml) | Retention Volumes (ml) | | | | | |
|---|---|---|---|---|---|---|---|
| | | Acetone | Phenol | p-Cresol | 2,5-xylenol | Anisole | Phenetole |
| C8-LIQ | 1.75 | 3.89 | 4.25 | 4.85 | 5.62 | 6.18 | 7.63 |
| C8-220 | 1.75 | 4.00 | 4.76 | 5.91 | 7.62 | 8.69 | 12.40 |
| C8-360 | 1.75 | 3.67 | 4.75 | 6.04 | 8.29 | 8.86 | 12.93 |
| C8 L/F | 1.80 | 3.63 | 4.59 | 5.88 | 8.24 | 12.24 | 20.83 |
| SPHER | 1.50 | 2.96 | 3.72 | 4.78 | 6.91 | 7.75 | 11.52 |
| SQUAL | 1.75 | 3.77 | 4.59 | 5.50 | 6.89 | 8.07 | 10.78 |

TABLE II

| | Elemental analysis | |
|---|---|---|
| Phase | % Carbon | % Hydrogen |
| C8-LIQ | 5.30 | 1.04 |
| C8-220 | 5.48 | 1.09 |
| C8-360 | 5.34 | 1.06 |
| C8-L/F | 6.25 | 1.30 |
| SPHER | 7.00 | not known |

Figure 2:
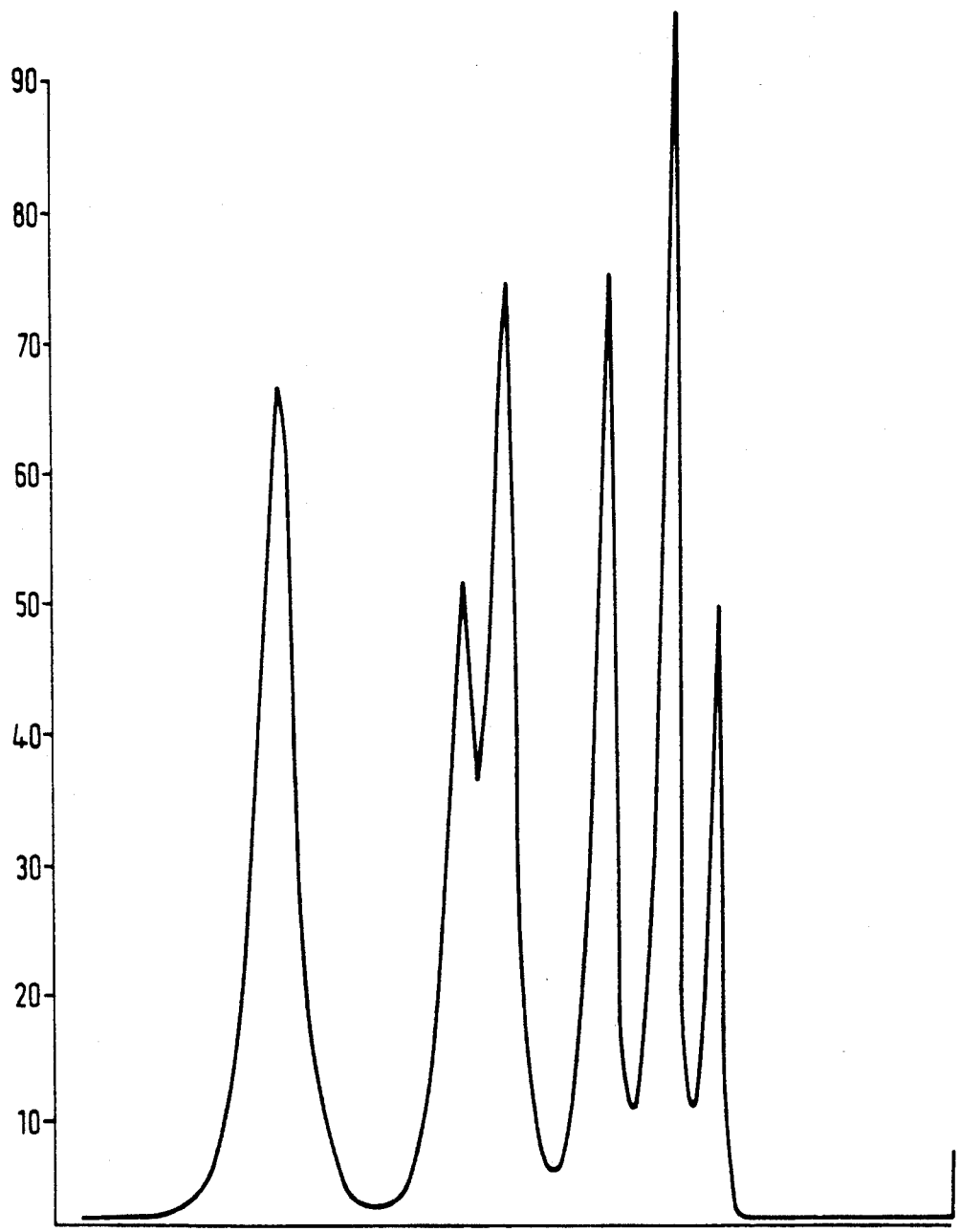
FIG. 2 shows a chromatogram of the separation of the components of a test mixture using C8-220.

FIG. 2 shows a chromatogram of the separation of the components of the test mixture using C8-220, by way of illustration.

of the duration of hydrothermal treatment on the surface area of the identical samples of silica gel at three hydrothermal treatment temperatures (150°, 200° and 250° C.). The surface area was measured by the BET method [Brunauer, Emmett & Teller, JACS (1938) 60, 309]. It is noted that (a) the surface area diminishes minimally even after 108 hours (when compared with true hydrothermal treatment in autoclaves at high pressure etc. for which one would expect figures of 30 to 50 $m^2/g$ after 108 hours), and (b) the decrease in surface area is minimal after 6 to 8 hours, the preferred treatment time for the process of this invention.

Table III reports thermogravimetric analysis of bonded phase products prepared by a variety of methods, the weight loss over the temperature range indicated by asterisks representing the concentration of silanol groups. The method referred to as "start silica" refers to the raw silica gel without any treatment whatever. In the Kovats method referred to, HPLC grade silica was heated to 900° C. then rehydrated in boiling water for 120 hours [J. Gobet & E. fz Kovats, Adsorp. Sci. & Technol (1984) 1, 77–92]. The weight loss, representing silanol groups was extremely low (0.2%). The process of the invention referred to as MK2P41 @ 200° C. refers to hydrothermal treatment at that temperature. It will be noted that it is this treatment which gives the greatest number of silanol groups (1.6% weight loss). Similarly process MK2P43 @300° C. refers to hydrothermal treatment at that temperature and gives a weight loss, representative of the silanol concentration, of 1.2%. In the process referred to as "start silica @200° C." the silica gel was heated in an oven at that temperature for 24 hours (the usual manner of activating silica gel).

TABLE III

| Sample | Thermogravimetric Analysis | |
|---|---|---|
| | Temperature (°C.) | % Weight Loss |
| Start Silica | 25–140 | 8.3 |
| | 140–321 | 0.5* |
| | 321–629 | 2.0* |
| | 629–1007 | 0.8 |
| | TOTAL LOSS | 11.6 |
| MK2P37 | 25–676 | 0.2* |
| Kovat's Exp. | 676–992 | 0.0 |
| | TOTAL LOSS | 0.2 |
| MK2P41. | 25–133 | 4.8 |
| @ 200° C. | 133–439 | 0.6* |
| | 439–637 | 1.0* |
| | 637–891 | 0.6 |
| | 891–1007 | 0.0 |
| | TOTAL LOSS | 7.0 |
| MK2P43 | 25–123 | 4.0 |
| @ 300° C. | 123–509 | 0.4* |
| | 509–804 | 0.8* |
| | 804–961 | 0.3 |
| | TOTAL LOSS | 5.5 |
| Start Silica | 25–140 | 4.6 |
| heated @ | 140–321 | 0.5* |
| 200° C. for | 321–629 | 0.9* |
| 24 hours | 629–1007 | 0.0 |
| | TOTAL LOSS | 6.0 |

Tables IV and V below give a comparison of octylsilyl bonded high density (Table IV) and low density (Table V) silica stationary phase produced by the process of this invention with a similar product made by a liquid phase process. The mean, and the standard deviation, are given for several replicates. It is to be noted that the product produced by the process of the invention has higher loading (expressed as % by weight of carbon) and higher coverage (expressed both as number of ligands per square nm and as mmol per square meter). In both cases the reproducibility (as seen from the standard deviation) is improved. Table V also includes comparative figures for material produced by the fluidised bed process of the invention but without the hydrothermal pretreatment.

TABLE IV

| | | High Density Silica | | |
|---|---|---|---|---|
| Condiitons | Run No. | % C | Coverage No. of ligands/nm² | mmol/m² |
| Fluidised | 1 | 11.66 | 2.15 | 3.57 |
| with prior | 2 | 11.45 | 2.10 | 3.49 |
| steam | 3 | 13.07 | 2.49 | 4.13 |
| treatment | 4 | 12.48 | 2.34 | 3.89 |
| mean | | 12.17 | 2.27 | 3.77 |
| standard deviation | | 0.75 | 0.18 | 0.29 |

TABLE V

| | | Low Density Silica | | |
|---|---|---|---|---|
| Conditions | Run No. | % C | Coverage No. of ligands/nm² | mmol/m² |
| Fluidised | 1 | 5.31 | 1.47 | 2.43 |
| no prior | 2 | 5.34 | 1.48 | 2.45 |
| steam | 3 | 5.30 | 1.46 | 2.43 |
| treatment | 4 | 5.48 | 1.52 | 2.52 |
| mean | | 5.36 | 1.48 | 2.46 |
| standard deviation | | 0.08 | 0.03 | 0.04 |
| Fluidised | 1 | 6.20 | 1.74 | 2.89 |
| with prior | 2 | 6.44 | 1.82 | 3.02 |
| steam | 3 | 6.25 | 1.76 | 2.92 |
| treatment | 4 | 6.04 | 1.69 | 2.81 |
| mean | | 6.23 | 1.75 | 2.91 |
| standard deviation | | 0.16 | 0.05 | 0.09 |
| Liquid Phase | 1 | 5.30 | 1.46 | 2.43 |
| | 2 | 4.13 | 1.12 | 1.85 |
| | 3 | 4.69 | 1.28 | 2.12 |
| | 4 | 5.23 | 1.44 | 2.39 |
| mean | | 4.84 | 1.32 | 2.20 |
| standard deviation | | 0.54 | 0.16 | 0.27 |

Figure 4:
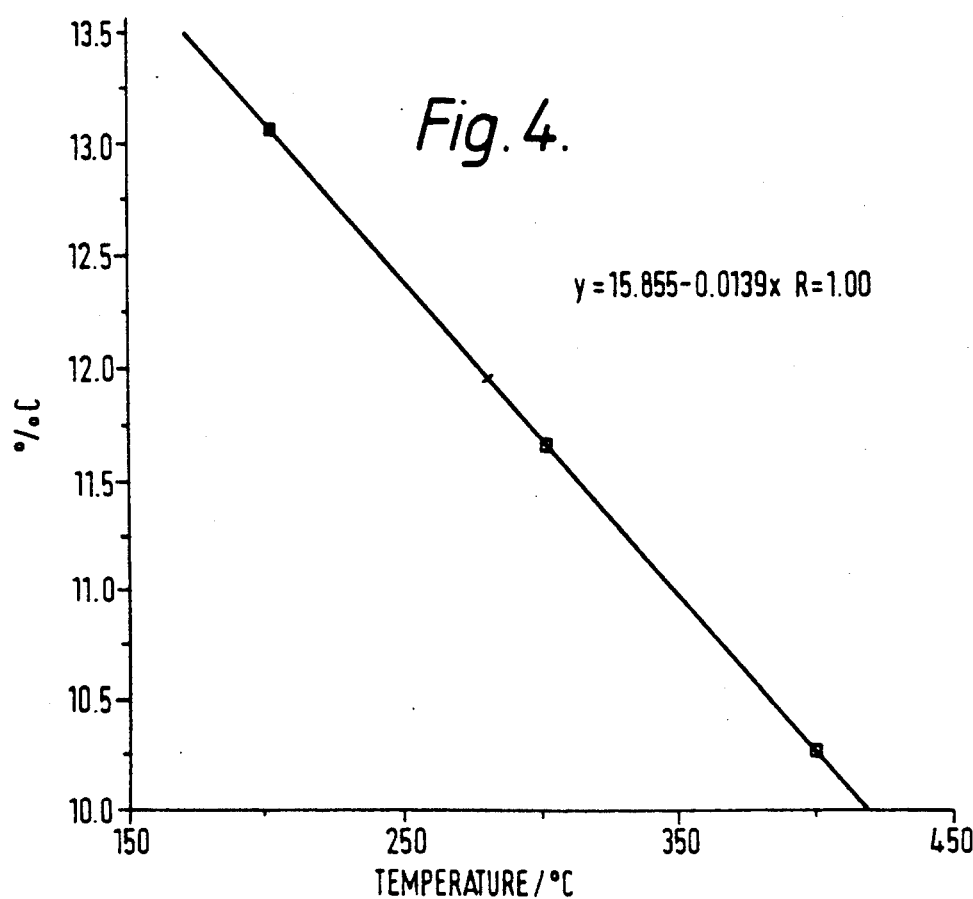
FIG. 4 is a graphical representation of carbon loading against reaction temperature.

Table VI below reports the carbon loading and coverage values obtained for a $C_8$ bonded phase prepared by the process of the invention from high density silica gel of particle size 20 micrometers at various reaction temperatures. FIG. 4 is a graphical representation of the carbon loading against reaction temperature from the data presented in Table VI.

TABLE VI

| Reaction Temperature °C. | % C | Coverage no. of ligands/nm² | Surface Area (Spgc*) m²/g | Pore Radius nm |
|---|---|---|---|---|
| 200 | 13.07 | 1.93 | 605.2 | 6.96 |
| 300 | 11.66 | 1.72 | 628.6 | 6.66 |
| 400 | 10.28 | 1.52 | 602.3 | 7.10 |

*Determined by gel permeation chromatography.

Figure 5:
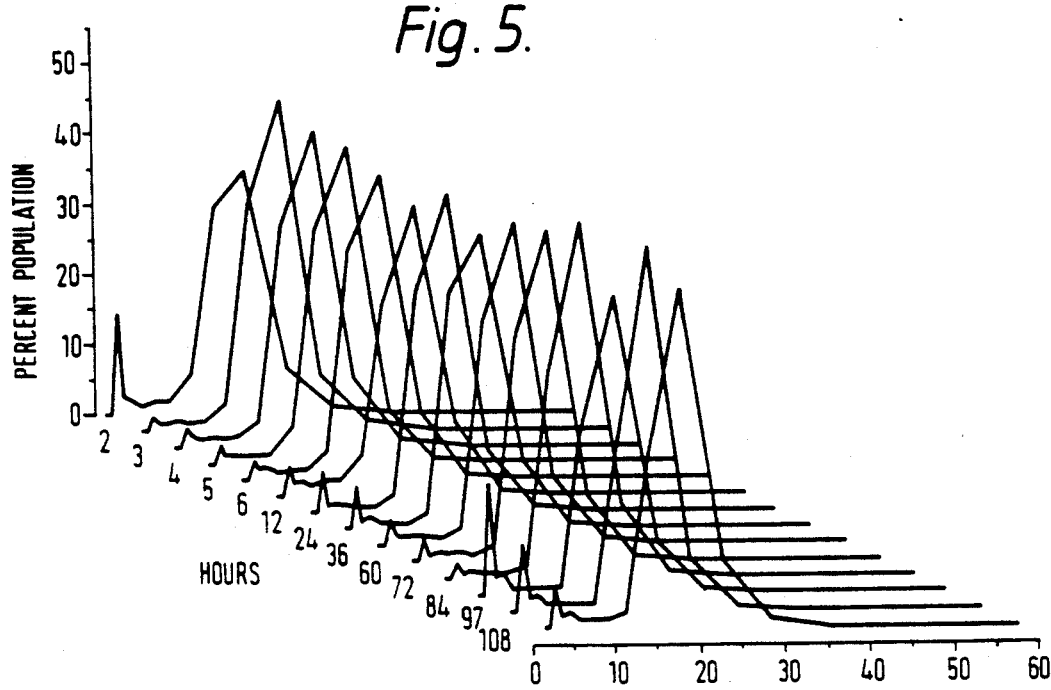
FIG. 5 is a graph of the variation in particle size distribution with hydrothermal treatment at 150° C.

FIG. 5 is a graph of the variation in particle size distribution with duration of hydrothermal treatment at 150° C. It is to be noted that as the duration increases there is a sharpening of the size distribution curve indicating an increasing uniformity of the material. The peak showing the presence of extremely fine (under 5 micrometers) particles progressive reduces with time. Although a proportion of fines reappears after a prolonged period (after 84 hours), this does not represent a problem as it is quite unecessary for the treatment to be continued for so long.

FIGS. 6 and 7 are chromatograms of a test mixture, the components of which are indicated on the chromatograms as follows:
  Peak 1 acetone
  Peak 2 phenol
  Peak 3 p-cresol
  Peak 4 2,5-xylenol
  Peak 5 phenetole.

Figure 6A:
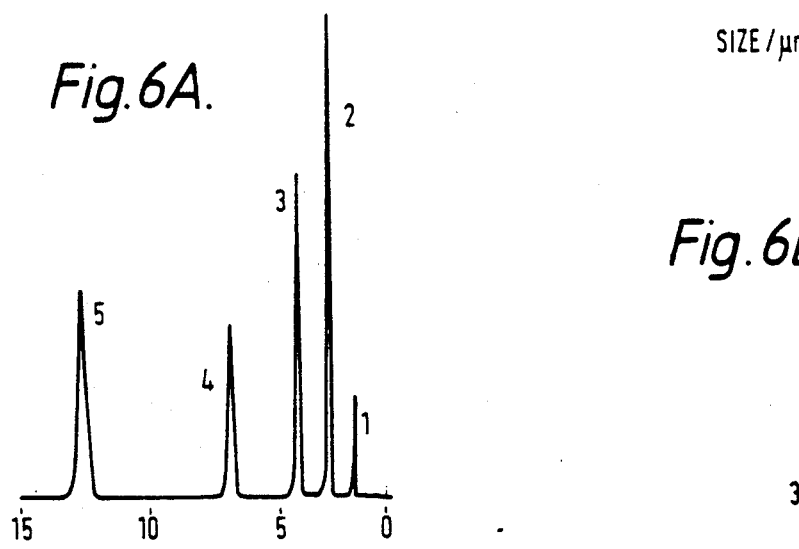
Figure 6B:
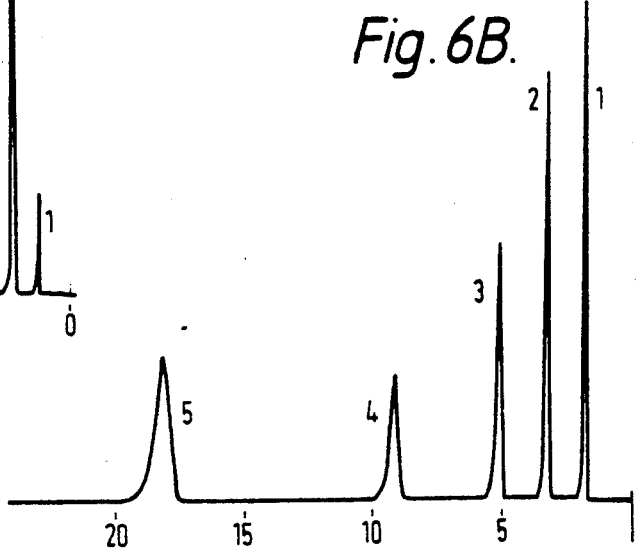
Figure 7A:
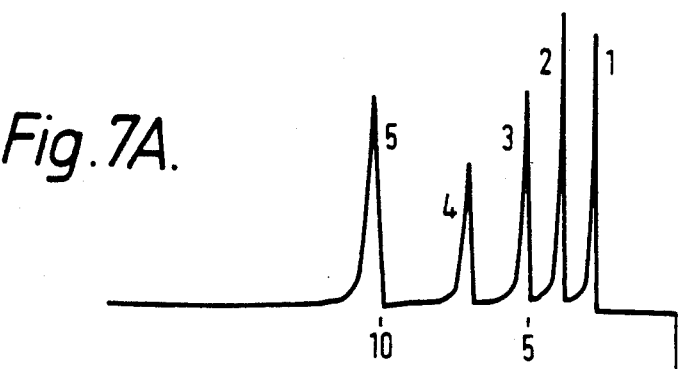
Figure 7B:
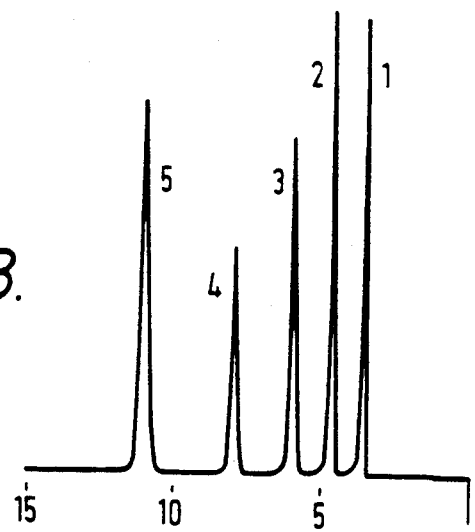
Figure 7C:
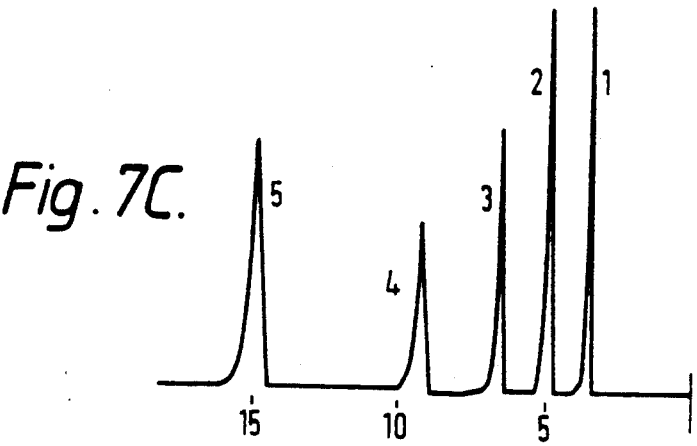

The mobile phase used was methanol:water (1:1 v/v) and the temperature was 20° C. In FIG. 6A the stationary phase was a commercially available material of 7 micrometers particle size having a $C_{18}$ bonded phase. In FIG. 6B the same basic silica and the same $C_{18}$ bonded phase were used but the bonding was effected by the fluidised bed process of the invention, including hydrothermal pretreatment. The flow rate used for the chromatograms in FIGS. 6A and 6B was 2 ml/min. In FIG. 7 the silica gel was also of 7 micrometers particle size but the bonded phase was $C_8$, FIG. 7A showing the result using a commercially available material, FIG. 7B material produced according to this invention without hydrothermal pretreatment and FIG. 7C with hydrothermal pretreatment. The flow rate used for the chromatograms in FIGS. 7A and 7B was 1 ml/min. A distinct sharpening of the peaks of the chromatograms is to be observed in FIG. 6B compared with 6A and in FIG. 7B compared with 7A. Improved separation of the peaks can clearly be seen by comparing FIG. 6B with 6A and FIG. 7C with both 7A and 7B.

Characterisation and Identification

Bonded stationary phases which have been prepared by the method of this invention are characterised by much improved uniformity of distribution of the bonded phase throughout the accessible surface bonding sites on the silica gel. This uniformity is believed, but we do not wish to be bound by this explanation, to be responsible for a sedimentation effect which may be used as a rough screening test to identify bonded stationary phases likely to have been produced by the process of this invention rather than by other methods. The theoretical basis for this test is not fully understood but it presents a practical method of detecting materials made according to the invention. Since the test must involve parameters such as particle size and density it may be that some combinations of these parameters will interfere and produce spurious indications. In such circumstances it may be possible to modify the test to accomodate parameters in the interfering ranges. However, with this reservation, the test is practical and useful as, at least, an initial screen.

Sedimentation tests for characterising bonded phases made by fluidised bed process.

a) About 0.2 grams of each of the various types of bonded phase were weighed into their respective sample tubes, and 2.5 ml of 50:50 v/v analytical grade methanol and distilled water was added to each of the sample tubes. The sample tubes were stoppered and were shaken simultaneously. The order of the sedimentation was noted in Table VII.

TABLE VII

| Weight used grams | Type | Order of Sedimentation | % C | Comments |
| --- | --- | --- | --- | --- |
| 0.1997 | MK2P7; Fluidised | 1 | 4.68 | |
| 0.2001 | MK2P11; Fluidised | 2 | 9.95 | |
| 0.2003 | MK2P15; Fluidised | 3 | 11.45 | |
| 0.2005 | MK2P5; Liquid | does not sediment | 13.59 | Hydrophobic, and froths |
| 0.2027 | Partisil 10 ODS-2 | 4 | 15.00 | Froths and partially sediments |
| 0.2015 | LiChrosorb RP-2 | 5 | 5.00 | Froths and partially sediments |

Note:
"Partisil" and "LiChrosorb" are Trade Marks

The starting material for all the bonded phase was Grace HPLC grade silica gel of average particle size 20 micrometre and nominal pore size of 60 Angstroms. All the reactions were carried out for about 6 hours with the following conditions, MK2P7; Fluidised at about 200° C.
MK2P11; Fluidised at about 234° C.
MK2P15; Fluidised at about 307° C.
MK2P5; Liquid phase reaction From these results, it was observed that the bonded phase made by the conventional liquid phase reaction is totally hydrophobic in 50:50 methanol/water mixture.

We claim:

1. A method of bonding to a pulverulent solid support an organic compound capable of imparting reversed phase properties to said support, said method comprising the steps of:

selecting a precursor of the organic compound which includes an active group capable of reacting under anhydrous conditions with a surface-residing hydroxyl group on the support with concomitant gas or vapor evolution;

providing a fluidizing column containing a bed of pulverulent solid support of a material sized and dimensioned for chromatographic utility and having accessible surface-residing hydroxyl groups for reaction;

introducing said precursor in the gaseous state to said bed of pulverulent solid support in said column; and fluidizing said bed under anhydrous conditions in said column such that fluidization thereof is achieved and maintained during reaction by gas or vapor generated in situ by a bonding reaction between said precursor active group and said surface-residing hydroxyl groups on said support thereby bonding said organic compound to said support to reproducibly form a support having reversed phase properties.

2. A method as claimed in claim 1 in which the support is selected from silica, alumina, titania, zirconia and ceria.

3. A method as claimed in claim 2 in which the support is silica gel.

4. A method as claimed in claim 3 in which the silica gel has a particle size of from 1 to 50 micrometers.

5. A method as claimed in claim 4, in which the particle size is from 3 to 35 micrometers.

6. A method as claimed in claim 3, in which the silica gel has a pore size of from 50 to 500 Angstrom units.

7. A method as claimed in claim 1, in which the precursor is an organically substituted silane which, on reaction with the support, produces a silica-bonded stationary phase.

8. A method as claimed in claim 7, in which the precursor is an organically substituted silane having the general formula $(R)_n SiX_{4-n}$ where R is selected from the group consisting of: a straight chain alkyl group, a branched chain alkyl group, a subtituted alkyl group, an alkoxy group having up to 24 carbon atoms, an aryl group, a substituted aryl group, and an aryloxy group; and X is an hydroxyl-reactive substituent.

9. A method as claimed in claim 6, in which the precursor has the general formula $R(CH_3)_2SiX$, where R and X are as defined in claim 7.

10. A method as claimed in claim 8, in which the alkyl, alkoxy or substituted alkyl group has from 1 to 18 carbon atoms.

11. A method as claimed in claim 10 in which the alkyl group is selected from the group consisting of: octyl and octadecyl.

12. A method as claimed in claim 8 in which the group represented by X is a halogen atom.

13. A method as claimed in claim 1, in which the precursor is selected from the group consisting of: alkylchlorosilanes, alkyltrichlorosilanes, trialkoxyalkylsilanes, and trialkoxysilyl-alkylamines.

14. A method as claimed in claim 13 in which the precursor is selected from the group consisting of: octyldimethylchlorosilane, octadecyl-trichlorosilane, octyltrimethoxysilane, octyltriethoxysilane, and 3-aminopropyltrimethoxysilane.

15. A method as claimed in claim 1, in which the support is preconditioned by steam treatment in the fluidized state at an elevated temperature.

16. A method as claimed in claim 15 in which the steam treatment is carried out at a temperature of from 100° C. to 400° C. for a period of from 3 to 24 hours.

17. A method as claimed in claim 1, in which chlorodimethylsilane, $Cl(CH_3)SiH$, is first bonded to the support surface and thereafter at least one additional precursor is introduced into the fluidized bed to increase the chain length of the bonded compound.

18. A method as claimed in claim 1, in which chlorodimethylsilane $Cl(CH_3)_2SiH$, is first bonded to the support surface and thereafter the chain length of the bonded support is increased by reaction with an appropriate precursor in solution.

* * * * *